US009616388B2

(12) United States Patent
Pimentel et al.

(10) Patent No.: US 9,616,388 B2
(45) Date of Patent: Apr. 11, 2017

(54) REVERSE OSMOSIS SYSTEM WITH AN AUTOMATED MODULATED BYPASS

(71) Applicant: CULLIGAN INTERNATIONAL COMPANY, Rosemont, IL (US)

(72) Inventors: Christian Pimentel, Burr Ridge, IL (US); Kerry Quinn, Palatine, IL (US); Doug Anderson, St. Charles, IL (US); Zach Schroeck, Arlington Heights, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 819 days.

(21) Appl. No.: 13/832,910

(22) Filed: Mar. 15, 2013

(65) Prior Publication Data
US 2014/0262989 A1    Sep. 18, 2014

(51) Int. Cl.
*C02F 1/44* (2006.01)
*B01D 61/12* (2006.01)
*C02F 1/00* (2006.01)
*C02F 1/28* (2006.01)

(52) U.S. Cl.
CPC .............. *B01D 61/12* (2013.01); *C02F 1/008* (2013.01); *C02F 1/441* (2013.01); *B01D 2311/04* (2013.01); *B01D 2311/246* (2013.01); *B01D 2311/25* (2013.01); *B01D 2313/083* (2013.01); *C02F 1/004* (2013.01); *C02F 1/283* (2013.01); *C02F 1/442* (2013.01); *C02F 2209/001* (2013.01); *C02F 2209/003* (2013.01); *C02F 2209/008* (2013.01); *C02F 2209/10* (2013.01); *C02F 2209/40* (2013.01); *C02F 2301/043* (2013.01); *C02F 2301/046* (2013.01)

(58) Field of Classification Search
None
See application file for complete search history.

(56) References Cited

U.S. PATENT DOCUMENTS

| | | | | |
|---|---|---|---|---|
| 3,774,763 A | | 11/1973 | Yall et al. | |
| 4,528,093 A | * | 7/1985 | Winer | B01D 61/08 210/257.2 |
| 5,582,205 A | * | 12/1996 | McCarty | B01D 35/04 137/545 |
| 5,993,671 A | | 11/1999 | Peltzer | |
| 6,077,444 A | | 6/2000 | Peltzer | |
| 6,224,778 B1 | | 5/2001 | Peltzer | |

(Continued)

Primary Examiner — Terry Cecil
(74) Attorney, Agent, or Firm — Greer, Burns & Crain, Ltd.

(57) ABSTRACT

A water filtering system including an inlet, an outlet and a filter positioned between the inlet and the outlet, where feed water enters the inlet and passes through the filter, and filtered water exits the through the outlet. A measurement device is connected to at least one of the inlet and the outlet measures a concentration of Total Dissolved Solids in at least one of the inlet and the outlet. A bypass valve is connected between the inlet and the outlet, and moves between a closed position and an open position, where the filtered water moves from the outlet to the inlet. A controller communicates with the measurement device and the bypass valve and automatically moves the bypass valve to a position between the closed position and the open position based on the concentration of the Total Dissolved Solids in the filtered water measured by the measurement device.

16 Claims, 3 Drawing Sheets

(56) References Cited

U.S. PATENT DOCUMENTS

| | | |
|---|---|---|
| 6,645,383 B1 | 11/2003 | Lee et al. |
| 7,338,595 B2 | 3/2008 | VanNewenhizen et al. |
| 2004/0168978 A1* | 9/2004 | Gray .................... B01D 61/025 210/636 |
| 2005/0000902 A1 | 1/2005 | Van Newenhizen et al. |
| 2005/0103717 A1 | 5/2005 | Jha et al. |
| 2006/0243647 A1 | 11/2006 | Mitsis |
| 2009/0134074 A1 | 5/2009 | Doran |
| 2009/0134080 A1* | 5/2009 | Fabig .................. B01D 61/022 210/137 |
| 2009/0194478 A1 | 8/2009 | Saveliev et al. |
| 2009/0283464 A1 | 11/2009 | Oe et al. |
| 2011/0163016 A1 | 7/2011 | Saveliev et al. |
| 2013/0126430 A1* | 5/2013 | Kenley .................. B01D 61/00 210/638 |

\* cited by examiner

REVERSE OSMOSIS SYSTEM WITH AN AUTOMATED MODULATED BYPASS

BACKGROUND

The present invention relates generally to fluid treatment systems such as water treatment systems, and more particularly to a reverse osmosis filtration system.

Untreated water includes dissolved minerals, salts, metals and other substances that affect the quality of the water. The dissolved solids in the water come from a variety of sources including leaves, silt, as well as fertilizers and pesticides used in landscaping and agriculture. The amount of the dissolved solids in the water, known as the total dissolved solids (TDS), affects water quality and taste. As a result, the Environmental Protection Agency (EPA) has set standards regarding the acceptable TDS in drinking water. There are also standards or ranges of allowable TDS that are allowable for other uses of water such as for boilers.

Water filter systems have been developed to reduce the TDS in water to meet the EPA's standards and to improve the quality of a water supply. One type of water filtration system is a reverse osmosis filter system that reduces the TDS by 90-99%. Reverse osmosis systems typically include a manual bypass valve that blends or mixes feed water (i.e., incoming water), such as potable water, with product water, treated water or filtered water (i.e., outgoing water) to achieve a desired TDS level in the water. The manual bypass valves are typically manually set to a fixed valve position, where the valve position includes any valve position including a fully closed position, a fully open position and any position therebetween, based on the TDS level in the feed water entering the system. However, the TDS level in feed water varies, and the filter/membrane in the reverse osmosis system degrades or scales over time, resulting in fluctuating feed water TDS concentration levels and product TDS concentration levels that are outside designated water quality standards. To account for such fluctuations in the TDS concentration levels in conventional reverse osmosis systems, the TDS concentration levels in the water must be manually monitored and the bypass valve must be manually adjusted based on the monitored levels to maintain the TDS concentration levels in the product water within desired levels and standards.

Accordingly, there is a need for a water filter system that automatically monitors TDS concentration levels in the water and automatically adjusts the bypass valve to account for variations in treated water TDS levels.

SUMMARY

A water filtering system is provided that measures a concentration of an impurity in incoming water, and more specifically, a TDS concentration in the incoming water, and automatically moves a bypass valve between a closed position and an open position based on the measured concentration of TDS for maintaining desired TDS concentrations.

Specifically, a water filtering system is provided and includes an inlet, an outlet and a filter positioned between the inlet and the outlet, where feed water enters the inlet and passes through the filter, and filtered water exits the through the outlet. A measurement device is connected to at least one of the inlet and the outlet and measures a concentration of Total Dissolved Solids in at least one of the inlet and the outlet. A bypass valve is connected between the inlet and the outlet, and moves between a closed position and an open position, where the filtered water moves from the outlet to the inlet. A controller communicates with both the measurement device and the bypass valve and automatically moves the bypass valve to a position between the closed position and the open position based on the concentration of the Total Dissolved Solids in the filtered water measured by the measurement device.

Another embodiment of the present water filtering system includes a treatment tank including a filter, an inlet and an outlet, where feed water enters the treatment tank and passes through the filter, and filtered water exits the treatment tank through the outlet. A measurement device is connected to the treatment tank and is configured for measuring a concentration of Total Dissolved Solids in the filtered water at the outlet. A bypass valve is connected to the inlet and the outlet, and is configured to move filtered water from the outlet to the inlet, and a valve is connected to the bypass and is movable between an open position and a closed position. A controller communicates with both the measurement device and the valve, and automatically moves the valve to a position between the closed position and the open position based on the concentration of the Total Dissolved Solids in the filtered water measured by the measurement device.

DETAILED DESCRIPTION

Figure 1:
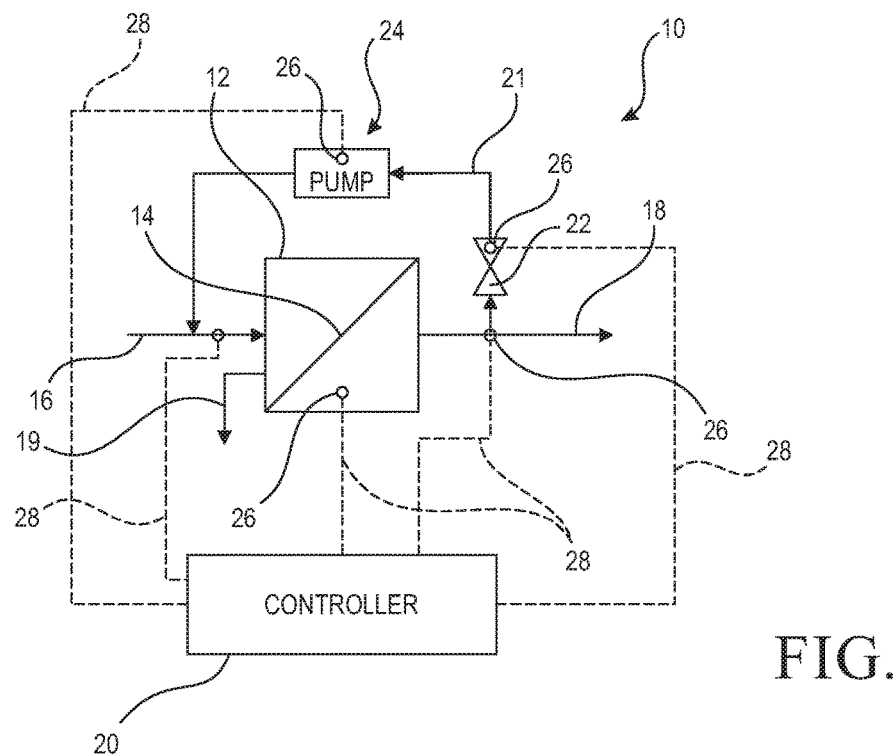
FIG. 1 is a schematic diagram of an embodiment of the present water filtering system.
Figure 2:
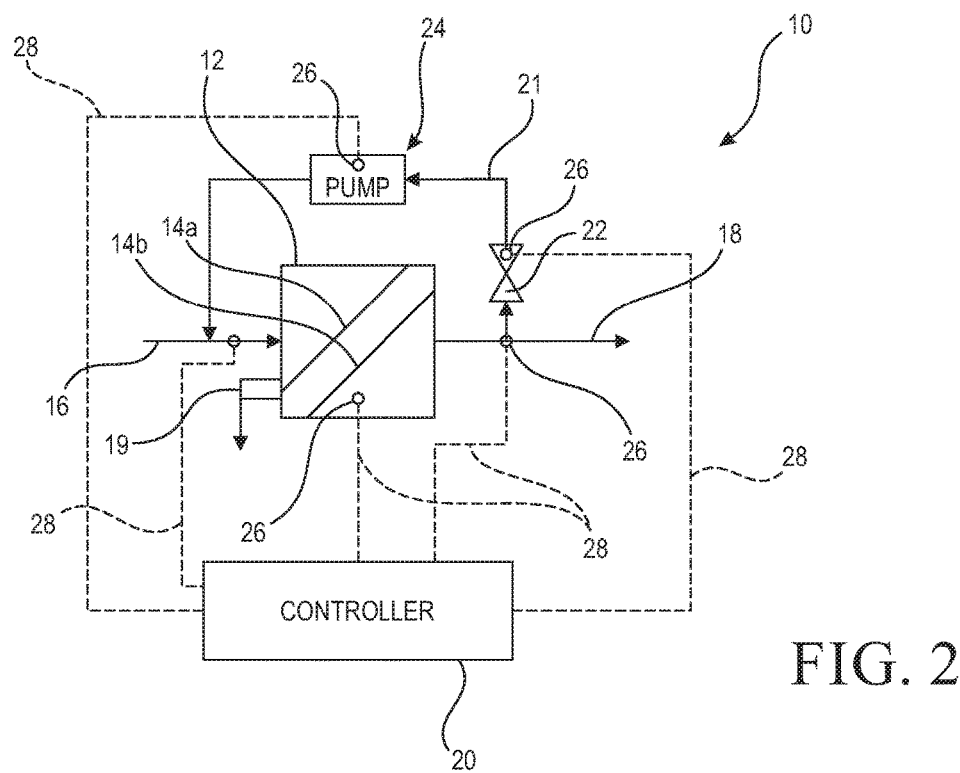
FIG. 2 is a schematic diagram illustrating another embodiment of the present water filtering system.

Referring to FIGS. 1-2, a water filtering system and more specifically, a reverse osmosis filtering system generally designated as reference number 10, includes at least one treatment tank 12 having at least one filter, preferably a reverse osmosis membrane 14 for removing impurities, such as dissolved solids, from feed water. The treatment tank 12 includes at least one incoming port or inlet 16 and at least one outgoing port or outlet 18. It should be appreciated that the treatment tank 12 may be a bladder tank, an atmospheric tank or any suitable tank. The filtering system 10 also does not have to include a treatment tank where the filter is installed directly in the inlet, the outlet, between the inlet and the outlet or in any other suitable part of the system. In the illustrated embodiment, incoming water or feed water is transferred to the treatment tank 12 via the inlet 16. Inside the treatment tank 12, a reverse osmosis filtering process is used to remove a portion of the feed water, i.e., retenate such as larger solids and other impurities in the water, and pass the remaining portion of the feed water, i.e., permeate, through the reverse osmosis filter. Specifically, the pressure inside the treatment tank 12 on the inlet side of the filter is increased to a level that is greater than the osmotic pressure in the tank to force the feed water through the filter and to the portion of the tank at the outlet side of the filter. It should be appreciated that one filter 14 (FIG. 1) or a plurality of filters 14a, 14b (FIG. 2) may be installed in the treatment tank 12 to filter the feed water. The retenate is removed from the treatment tank 12 via a drain 19.

The total dissolved solids (TDS) in incoming potable water is a factor that affects the quality and taste of the water. The reverse osmosis filtering process described above typically removes between 90 to 99% of the TDS in the potable water. The particular percentage of the TDS removed from the water depends on the application. For example, TDS affects the taste and overall quality of tap water or drinking water. Typical TDS concentration levels in tap water are between 140-400 ppm (140-400 mg/L). Employing a reverse osmosis filter system reduces the TDS concentration level in the water to between 0-50 ppm (0-50 mg/L) so that the water is suitable for drinking. In other applications, such as water used in industrial boilers, the TDS concentration level is typically higher.

To help control the TDS concentration levels in the water, the present reverse osmosis filtering system 10 includes a controller 20 that automatically monitors TDS concentration levels at various points in the system, and a bypass or bypass line 21 including an automated, modulated bypass valve or bleed valve 22 connected to the outlet 18 of the treatment tank 12 to re-direct filtered or product water through the bypass line from the outlet 18 to the inlet 16 based on the measured TDS concentration levels communicated to the controller. It should be appreciated that the bypass valve 22 may be a hydraulic valve or any suitable valve. Additionally, it is contemplated that the present reverse osmosis filtering system 10 may include one or a plurality of bypasses 21 and/or bypass valves 22 for moving the treated product water from the outlet 18 to the inlet 16.

As shown in FIG. 1, a pump 24 is connected to the bypass line 21 and is turned "on" or activated by the controller 20 when the bypass valve 22 is opened to pump the product water from the outlet 18, through the bypass line 21 and to the inlet 16. It should be appreciated the bypass may include one or more pumps 24, and that the pump may be a hydraulic pump or any suitable pump. It is contemplated that modulation logic programmed into the controller can utilize the operation of the pump 24, i.e., when the pump is "on" or running, to control the mixing ratio of the feed water to the product water at the inlet 16. The data on the operation of the pump 24 can also be used to determine the integrity of the filter or filters in the filtering system. For example, an increase in the operation of the pump 24 indicates that degradation and/or scaling of the filter or filters in the system are occurring.

As described above, conventional water filter systems include a bypass valve that is manually opened or closed based on manually monitored TDS concentration levels in the water. Manually monitoring the TDS concentration levels and manually adjusting the bypass valve in such systems is inefficient and inaccurate. TDS concentration levels in most water sources, such as rivers and lakes, greatly fluctuate so that the TDS concentration level in the incoming water or feed water at the inlet 16 is also variable. In addition, the TDS concentration levels in the water rise as the filter in the treatment tank 12 degrades and/or scales over time, thereby reducing effectiveness. As a result, it is very difficult to maintain consistent TDS concentration levels in the product water in conventional filter systems by manually monitoring the TDS concentration levels and manually adjusting the bypass valve based on the monitored TDS concentration levels.

The controller 20 and modulated bypass valve 22 of the present reverse osmosis filtering system 10 overcomes the above problems. As shown in FIG. 1, the controller 20 includes a plurality of measurement devices such as probes 26 connected to different monitoring points in the filtering system 10 where the probes automatically measure the concentration levels of TDS in the water at the monitoring points. Specifically in the illustrated embodiment, probes 26 are installed or mounted at the water inlet 16, the treatment tank 12, the outlet 18, the bypass valve 22 and the pump 24. It should be appreciated that the present filter system 10 may have one measurement device or probe 26 or any suitable number of probes installed in the filtering system and in communication with the controller 20. Based on the TDS concentration levels measured by the probe or probes 26 at one or more of the monitoring points, the controller 20 sends a signal to the bypass valve 22 to turn "on" or "off" resulting in the valve moving to a fully open position, a fully closed position or a partially open position, i.e., a position between the open position and the closed position, depending on the mixing ratio of the product water to the filtered water required at the inlet 16 to produce the desired TDS concentration level at the outlet 18.

In operation, incoming water or feed water is supplied to the treatment tank 12 to be filtered for subsequent use or a subsequent application. It is also contemplated that filtered water or processed water may be supplied to the treatment tank 12 if further filtering of impurities from the filtered water is required. In the illustrated embodiment, the feed water enters the treatment tank 12 through inlet 16 and passes through at least one filter or membrane 14 configured to remove a designated amount or percentage of the TDS from the feed water. The removed TDS is part of the retenate that exits the treatment tank through a drain 19 (FIG. 1). As discussed above, in a reverse osmosis filtering system, the treatment tank 12 is pressurized by a suitable pressurization device, such as a pump (not shown), on the inlet side of the filter 14 to increase the pressure on the inlet side and force a portion of the feed water (i.e., the permeate) through the filter to the outlet side of the filter. The filtered water then exits the treatment tank via the outlet 18.

In the illustrated embodiment, the measured TDS concentration level is communicated to the controller 20 via suitable communication wires/cables 28 or wirelessly. The controller 20 determines if the measured TDS concentration level in the filtered water is at or below a designated maximum TDS concentration level or within a designated TDS concentration level range. If the measured TDS concentration level is acceptable based on the designated TDS concentration level or range programmed into the controller 20, no adjustment of the feed water is necessary and the bypass valve 22 remains closed or in the closed position.

When the measured TDS concentration level in the filtered water exceeds a designated TDS concentration level or is outside of a designated TDS concentration level range, the controller 20 sends a signal to the bypass valve 22 via wiring/cables 28 or wirelessly to at least partially open or move to the open position. The pump 24 connected to the bypass 21 is turned on and pumps filtered/product water from the outlet 18 to the inlet 16. The amount of the product water pumped from the outlet 18 to the inlet 16 depends on the mixing ratio of the feed water and the product water at the inlet needed to achieve the designated TDS concentration level in the product water. Thus, the controller 20 automatically controls the bypass valve 22 to open a designated amount (from the closed position to the open position) based on the designated TDS concentration level needed at the outlet 18.

The present reverse osmosis filtering system 10 automatically monitors the TDS concentration levels at different points in the system and automatically adjusts the bypass 21, and more specifically, the bypass valve 22 to move filtered or product water from the outlet 18 to the inlet 16 to account for variations of the TDS concentration level in the feed water and degradation of the filter 14 over time. The present system thereby ensures that the TDS concentration levels in the water are consistently below a designated maximum TDS concentration level or within a designated TDS concentration level range without the inefficiency of manually monitoring the TDS concentration level and manually adjusting the bypass valve, which saves significant time and costs.

Figure 3:
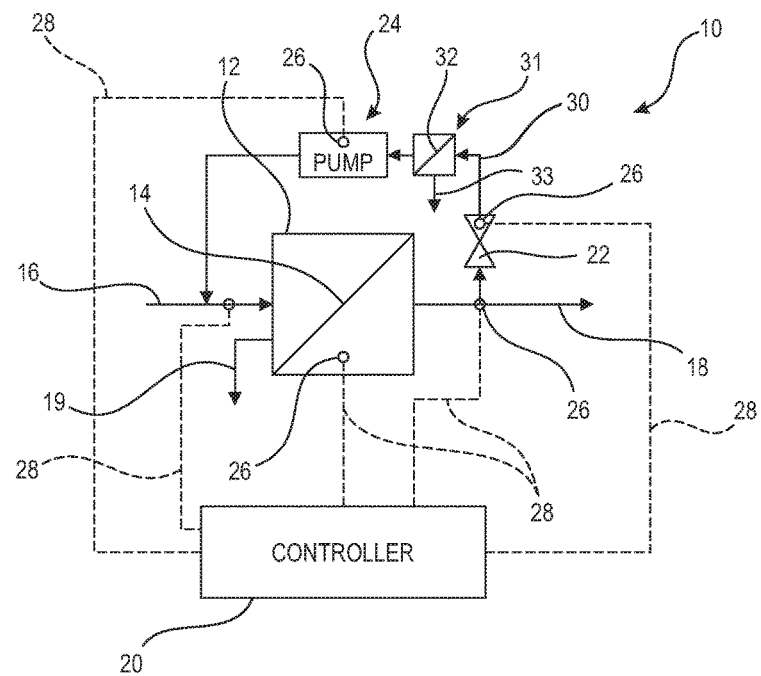
FIG. 3 is a schematic diagram illustrating a further embodiment of the present water filtering system.

Referring now to FIG. 3, another embodiment of the present reverse osmosis system is illustrated where the system includes a bypass or bypass line 30 having an additional filter assembly 31 including a filter, such as reverse osmosis filter/membrane 32, a carbon filter, a nano-filter or any suitable filter, for further reducing the TDS concentration level in the product water prior to mixing it with the feed water at the inlet 16. The retenate removed from the water by the membrane 32 exits the filter assembly via a drain 33. It should be appreciated that the bypass line 30 may include one filter or a plurality of additional filters, such as a plurality of the reverse osmosis membranes 32, for filtering the TDS and other impurities from the water.

Figure 4:
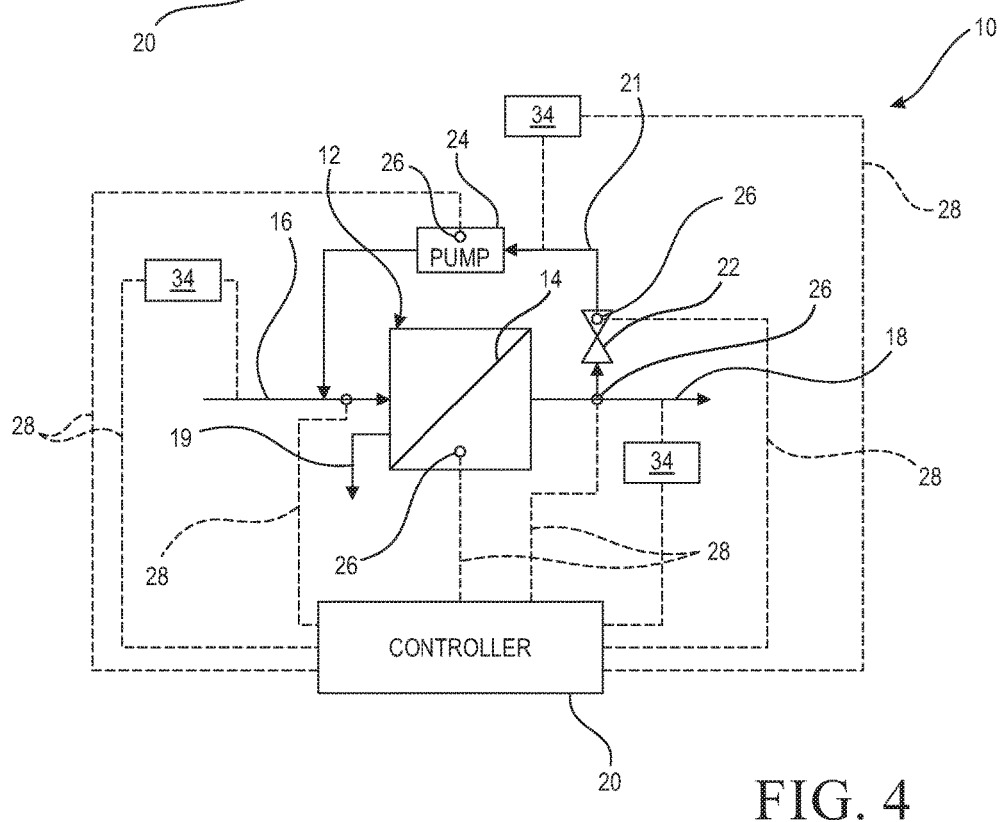
FIG. 4 is a schematic diagram illustrating another embodiment of the present water filtering system, where the system includes at least one flow meter.

Referring now to FIG. 4, in a further embodiment, one or a plurality of flow meters 34 are connected to at least one of the following: the inlet 16, the bypass line 21 and the outlet 18, for determining the flow rate of the water at one or more of these locations and adjusting the flow rate as needed to control the mixing ratio of the feed water and the product water at the inlet 16 to achieve designated TDS concentration levels in the product water. The flow meters 34 may be any suitable flow meters used to measure fluid flow.

Figure 5:
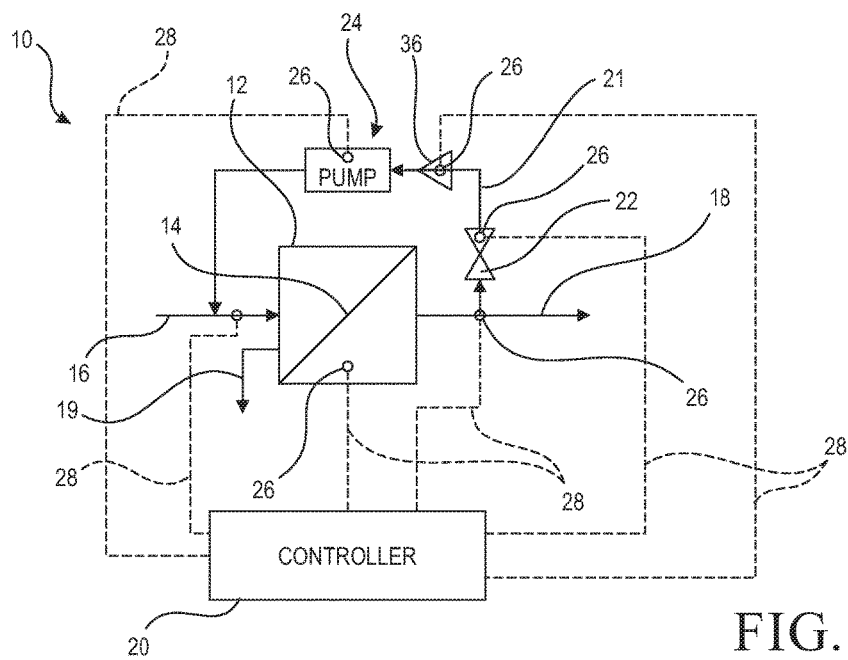
FIG. 5 is a schematic diagram illustrating a further embodiment of the present water filtering system, where the system includes at least one flow restrictor.

Referring now to FIG. 5, in another embodiment, one or a plurality of flow restrictors 36 are connected to the bypass line 21 to control the amount and velocity of the product water flowing through the bypass. The flow restrictor or flow restrictors 36 are connected to the controller 20 via wires 28 or wirelessly so that the controller 20 automatically controls the operation of the flow restrictor or the flow restrictors.

Figure 6:
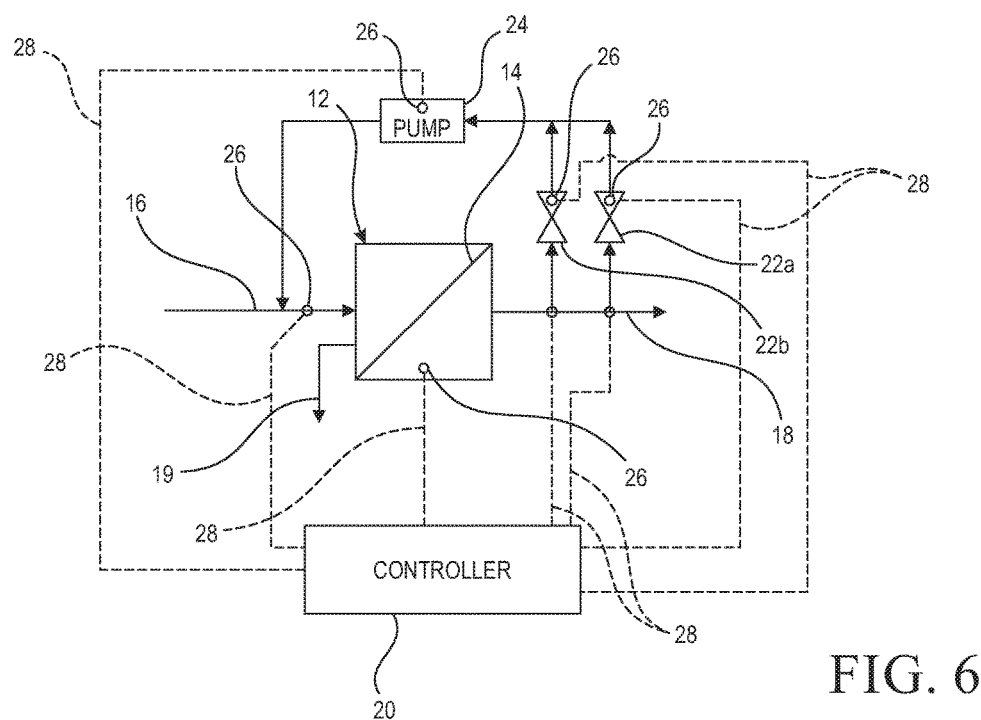
FIG. 6 is a schematic diagram illustrating another embodiment of the present water filtering system, where the system includes a plurality of bypass valves.

Referring to FIG. 6, in a further embodiment, the present reverse osmosis system includes a plurality of bypass valves or bypass lines 22a and 22b for re-directing product water from the outlet 18 to the inlet 16 for achieving a designated TDS concentration level in the product water. Each of the bypass valves 26 are in communication with the controller 20 via suitable wires/cables 28, where the controller automatically controls or adjusts one, a plurality or all of the bypass valves 26, to achieve the desired TDS concentration level at the outlet 18. It should be appreciated that the present reverse osmosis system may include one or more bypass valves 26 forming one or more bypass lines.

While a particular embodiment of the present reverse osmosis filtering system has been described herein, it will be appreciated by those skilled in the art that changes and modifications may be made thereto without departing from the invention in its broader aspects.

What is claimed is:

1. A water filtering system comprising:
   an inlet;
   an outlet in fluid communication with said inlet;
   a filter positioned between said inlet and said outlet, wherein feed water enters said inlet and passes through said filter, and filtered water exits through said outlet;
   a measurement device connected to at least one of said inlet and said outlet, and configured for measuring a concentration of Total Dissolved Solids in at least one of said inlet and said outlet;
   a bypass valve connected between said inlet and said outlet, and including a plurality of different open positions having at least one partially open position, said bypass valve being configured for moving to one of the plurality of different open positions between a fully open position, wherein the filtered water moves from said outlet to said inlet, and a closed position, wherein the filtered water does not move from said outlet to said inlet; and
   a controller in communication with said measurement device and said bypass valve, wherein said controller receives at least one measurement of the concentration of Total Dissolved Solids from said measurement device, compares said at least one measurement with a pre-determined concentration of Total Dissolved Solids, selects one of the plurality of open positions of said bypass valve based on the comparison of said at least one measurement of the concentration of the Total Dissolved Solids in the filtered water measured by said measurement device and said pre-determined concentration of Total Dissolved Solids, and a mixing ratio of the feed water and the filtered water required at said inlet to produce said pre-determined concentration of Total Dissolved Solids at said outlet, and automatically moves said bypass valve to the selected one of the plurality of open positions.

2. The water filtering system of claim 1, further comprising a plurality of filters, each of said filters positioned between said inlet and said outlet, wherein feed water enters said inlet and passes through at least one of said filters and filtered water exits through said outlet.

3. The water filtering system of claim 1, further comprising a plurality of measurement devices, wherein one of said measurement devices is connected to each of said inlet, said outlet and said bypass valve.

4. The water filtering system of claim 1, further comprising at least one additional bypass valve connected to said inlet and said outlet and configured to move filtered water from said outlet to said inlet, said at least one additional bypass being in communication with said controller.

5. The water filtering system of claim 1, wherein said bypass valve includes at least one filter configured to remove impurities from the filtered water.

6. The water filtering system of claim 1, further comprising at least pump connected to said bypass valve for moving the filtered water through said bypass valve.

7. The water filtering system of claim 1, further comprising a flow meter connected to at least one of said inlet, said outlet and said bypass valve, said flow meter being in communication with said controller.

8. The water filtering system of claim 1, further comprising at least one flow restrictor connected to said bypass valve and in communication with said controller.

9. A water filtering system comprising:
   a treatment tank including a filter, an inlet and an outlet, wherein feed water enters said treatment tank and passes through said filter, and filtered water exits the treatment tank through said outlet;

a measurement device connected to said treatment tank and configured to measure a concentration of Total Dissolved Solids in the filtered water at said outlet;

a bypass connected to said inlet and said outlet, and configured to move filtered water from said outlet to said inlet;

a valve connected to said bypass and movable to one of a plurality of different open positions including at least one partially open position, between a fully open position and a closed position; and a controller in communication with said measurement device and said valve, wherein said controller receives at least one measurement of the concentration of Total Dissolved Solids from said measurement device, compares said at least one measurement with a pre-determined concentration of Total Dissolved Solids and automatically moves said valve to a selected one of the plurality of different open positions based on the comparison of said at least one measurement of the concentration of the Total Dissolved Solids in the filtered water measured by said measurement device and said pre-determined concentration of Total Dissolved Solids, and a mixing ratio of the feed water and the filtered water required at said inlet to produce said pre-determined concentration of Total Dissolved Solids at said outlet.

10. The water filtering system of claim 9, wherein said treatment tank includes a plurality of filters.

11. The water filtering system of claim 9, further comprising a plurality of measurement devices, wherein one of said measurement devices is connected to each of said inlet, said treatment tank and said outlet.

12. The water filtering system of claim 9, further comprising at least one additional bypass line connected to said inlet and said outlet and configured to supply filtered water from said outlet to said inlet, said at least one additional bypass including a valve in communication with said controller.

13. The water filtering system of claim 9, wherein said bypass includes at least one filter configured to remove impurities from the filtered water.

14. The water filtering system of claim 9, wherein said bypass includes at least pump for moving the filtered water through said bypass.

15. The water filtering system of claim 9, further comprising a flow meter connected to at least one of said inlet, said outlet and said bypass, said flow meter being in communication with said controller.

16. The water filtering system of claim 9, further comprising a flow restrictor connected to said bypass and in communication with said controller.

* * * * *